United States Patent

McNamara et al.

[15] 3,675,100
[45] July 4, 1972

[54] CIRCUIT FOR MULTI-SPEED TWO-PHASE MOTOR

[72] Inventors: Thomas J. McNamara; Arlon G. Sangster, both of c/o Decitek Division of the Jamesbury Corp., 15 Sagamore Road, Worcester, Mass. 01605

[22] Filed: Jan. 15, 1971

[21] Appl. No.: 106,796

Related U.S. Application Data

[63] Continuation-in-part of Ser. No. 783,867, Dec. 16, 1968, abandoned.

[52] U.S. Cl. .................. 318/220 R, 318/221, 318/225 R, 318/227, 318/229, 318/231
[51] Int. Cl. .......................................... H02p 7/36
[58] Field of Search .................. 318/212, 220, 221, 225, 227, 318/228, 229, 231

[56] References Cited

UNITED STATES PATENTS

| 3,504,255 | 3/1970 | L'Esperance | 318/227 |
| 2,586,095 | 2/1952 | Roters | 318/228 X |
| 2,606,311 | 8/1952 | Burian | 318/228 X |
| 2,740,932 | 4/1956 | King | 318/212 X |

*Primary Examiner*—Gene Z. Rubinson
*Attorney*—Charles R. Fay

[57] ABSTRACT

This circuit utilizes an RLC network, using the motor winding as a component, to alter the speed of an ac two-phase servo motor. The RLC circuit produces a dc component and variable frequency ac component which effectively produce a signal on the control winding of the motor. Power for the RLC network is taken from the ac line through a rectifier (diode).

3 Claims, 5 Drawing Figures

PATENTED JUL 4 1972 3,675,100

INVENTORS
THOMAS J. McNAMARA
ARLON G. SANGSTER

BY Charles P. Fay
ATTORNEY

CIRCUIT FOR MULTI-SPEED TWO-PHASE MOTOR

This is a continuation-in-part of application, Ser. No. 783,867 filed Dec. 16, 1968 and now abandoned.

BACKGROUND OF THE INVENTION

It is well known that two-phase induction motors with high slip rotors may be controlled over wide speed ranges but only when appropriate external control such as variable frequency sources, mechanical or electrical loading devices, separate power or reference sources, are employed. This invention provides for the setting of speed on such motors over wide speed ranges without the introduction of any external reference, power supply, or mechanical device.

SUMMARY OF THE INVENTION

The present circuit provides a means of obtaining two or more motor speeds using a minimum of components by providing a component of a low frequency current in the control winding of the motor. This low frequency component may be obtained by utilizing a capacitor of suitable size working in concert with the inductance of the winding with a means for replacing energy lost in resistive elements of the capacator and induction. The motor has two windings which are referred to as the reference winding and the control winding, and the present circuit provides for current through the reference winding directly from the line for high speed operation; and a component of low frequency current through the control winding in combination with the connection of the reference winding as before, for slow speed. The low frequency is obtained by means of circuit components without the introduction of any external low frequency control signals.

DESCRIPTION OF THE PREFERRED EMBODIMENTS

Figure 1:
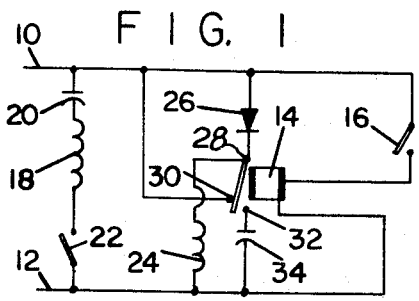
FIG. 1 is a circuit diagram illustrating a simple electric circuit providing high and low speeds in a two-phase AC servo motor, and FIGS. 2 to 5 inclusive are similar circuitry diagrams illustrating modifications for obtaining essentially the desired result obtained by the circuitry in FIG. 1.

Referring now to FIG. 1, the lines at 10 and 12 may be suitably connected through an over-riding "on" and "off" switch to a source of current, say for instance the usual power source 110 AC. The circuit includes a relay at 14 and an "on" and "off" switch at 16. Switch 16 controls only a portion of the control winding circuit to be described.

Directly across the lines 10 and 12 there is shown the "reference" winding at 18 having a capacitor 20 located between it and the source of current. It also has an "on" and "off" switch 22.

This capacitor is employed in a manner well known to obtain a phase shift used in all multi-phase motors operating from a single phase source of power.

The 'control' winding is indicated at 24. This winding is connected through a diode 26 across the line 10 and 12. In addition between the control winding 24 and the diode 26 there is a connection at 28 for the contacts 30 normally closed and 32 normally open. These are contacts of the relay 14 and are connected across the line, the contact of the relay at 32 being through a capacitor 34. This capacitor is employed in a manner well known to obtain a phase shift used in multi-phase motors operating from a single phase source of power. Capacitor 34 is utilized with the inductance of the motor winding to produce a low frequency oscillator.

As shown in the diagram, the parts are at rest and depending upon the "on" and "off" over-riding switch (not shown), the motor will be driven at high speed. However when the relay at 14 is actuated, it opens normally closed contacts 30 and closes normally open contacts 32. Because of the presence of the diode in circuit with control winding 24 and its capacitor 34, etc., this causes low frequency to be generated. When relay contact 32 closes, a tank circuit is formed utilizing capacitor 34, motor winding 24, and source of energy supplied through diode 26 to generate the low frequency and cause the motor to run at a speed having a relationship to the supplied frequency depending upon the external load applied to the motor. There is no synchronous relationship involved.

The exact reason why this is so is not known to the inventors. However the size of the capacitor at 34 determines the low frequency which is imposed on the control winding and the circuit shown in FIG. 1 results in speed ranges of 100 to 1. Increasing the capacitor size will lower the speed setting still further.

The switch at 22, if suddenly opened, will cause the motor to be braked and it will slow down and stop as if dynamic braking had been applied because of the energization in the manner described of the control winding. If switch 22 were not present or always remained closed when power is removed, the rotor of the motor will coast to a stop without any braking action.

Figure 2:
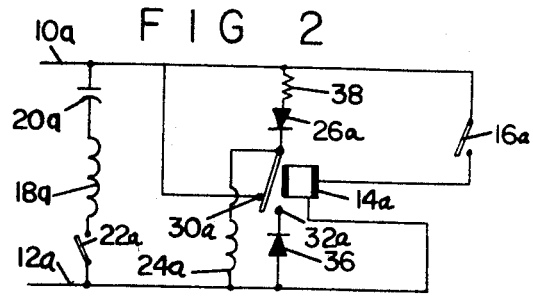
Figure 3:
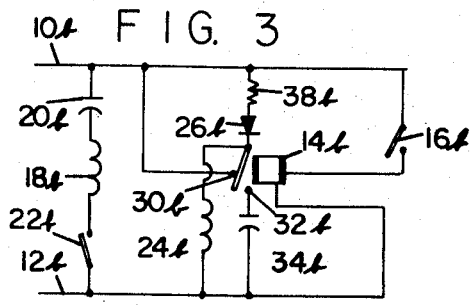

Similar results can be obtained by the diagram shown in the other figures. In circuit illustrated in FIG. 2, resistor 38 is added as a current or torque limiting device which results on loss of motor power but provides for less heat generation in the motor during long periods of low speed operation. FIG. 3 is similar to FIG. 2 but diode 36 has been replaced by the original capacitor 34b.

Figure 4:
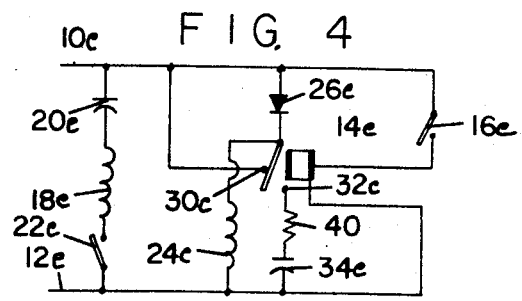

In the circuit illustrated in FIG. 4, resistor 40 is added to limit tank circuit current when extremely low frequencies must be generated for very low speed motor operation.

Figure 5:
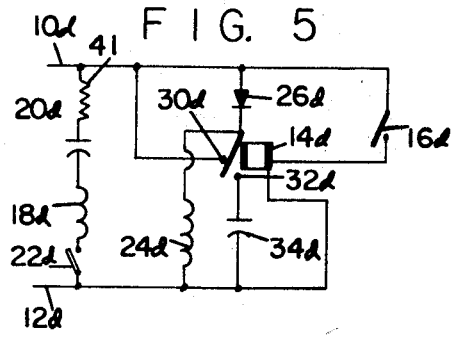

In the circuit illustrated in FIG. 5, resistor 41 is added to reduce the motor response to the frequency command, through a phase shifting network.

We claim:

1. A motor control system comprising an AC induction motor having two windings and a high slip rotor, one winding being connected to a source of power through a phase shift network and a second winding being connected to the same source of power either directly for full speed operation or selectively connecting a capacitor in series parallel to said second winding and thereby causing said second winding and capacitor to operate in conjunction with each other to effect an oscillator or tank circuit and providing meanS to replace energy lost in the oscillator or tank circuits thereby causing the motor to rotate at a slower speed that is a function of the frequency of the tank circuit oscillator.

2. A motor control system in accordance with claim 1 wherein the phase shift network and associated motor winding are selectively interruptable to cause the motor to stop and hold the rotor essentially in a locked position.

3. A motor control system in accordance with claim 1 wherein current limiting devices are selectively applied in the circuit to reduce motor response, to decrease heating at locked rotor position, and to allow operation at very low speeds.

* * * * *